T. G. OCKLEY.
PNEUMATIC TIRE PROTECTOR.
APPLICATION FILED NOV. 3, 1916.

1,284,757.

Patented Nov. 12, 1918.

Witnesses.
S. A. Jones.
C. E. Brown.

Inventor
Thomas G. Ockley

UNITED STATES PATENT OFFICE.

THOMAS G. OCKLEY, OF KINGSTON, ONTARIO, CANADA.

PNEUMATIC-TIRE PROTECTOR.

1,284,757.  Specification of Letters Patent.  Patented Nov. 12, 1918.

Application filed November 3, 1916. Serial No. 129,391.

*To all whom it may concern:*

Be it known that I, THOMAS G. OCKLEY, a citizen of Canada, residing at Kingston, in the county of Frontenac, Province of Ontario, Canada, have invented new and useful Improvements in Pneumatic-Tire Protectors, of which the following is a specification.

My invention relates to protectors for the inner tubes of pneumatic tires and has for its object the provision of a device of this character which will positively protect the tire tube from punctures due to penetrating substances.

Another object of my invention is the provision of a device which will adapt itself to the ordinary tire structure without necessitating any change in the construction thereof.

My invention lies in a protector formed of resilient material preferably metal, adapted to be inserted between the casing and the air tube and means for holding the same against creeping around the tire and for preventing any chafing of the tube and casing while allowing of a slight relative movement between the meeting ends of the protector, to insure a perfect fit at all times between the protector and the tire.

In the drawing forming part of the specification Figure 1 is a plan view of the inner portion of my protector before being bent to shape.

Figure 1:
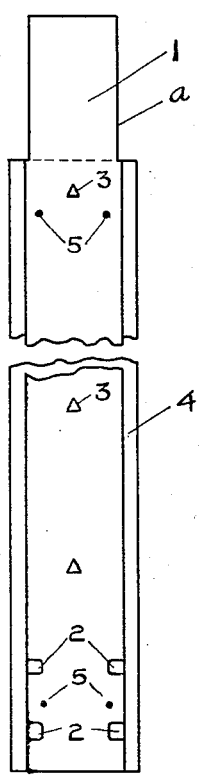
Figure 2:
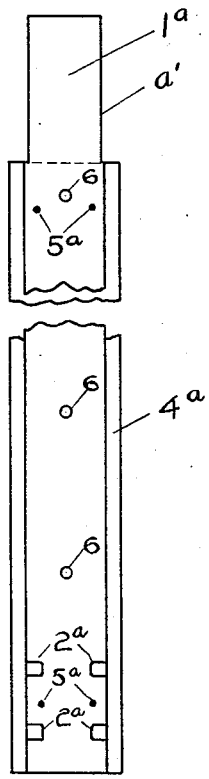
Fig. 2 is a plan view of the outer portion of the same also before it is bent to shape.
Figure 3:
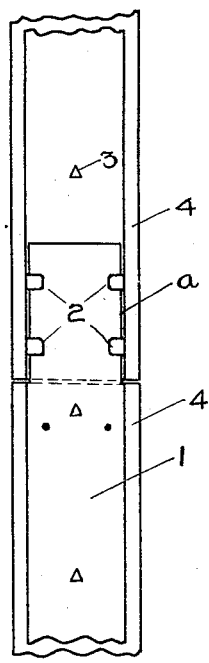
Fig. 3 shows the mode of forming the joint of the meeting ends of the protector the same form of joint being provided in both the inner and the outer portions.
Figure 4:
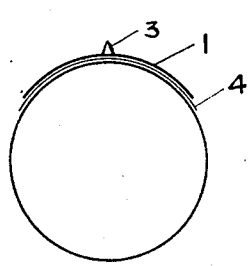
Fig. 4 is a diagrammatic representation of a tube with the inner portion of the protector in position thereon.
Figure 5:
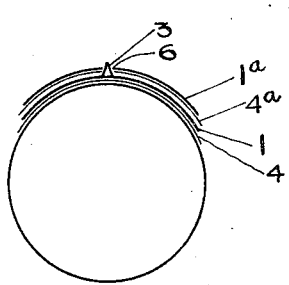
Fig. 5 is a diagrammatic representation of the tube with both portions of the protector in place.

Referring to the drawings 1 is a strip of sheet metal of the desired resiliency bent to embrace the circumference of the tread portion of the inner tube. One end of said strip is made narrower as at A and the other end is provided with flanges 2 extending toward the axis of the strip. These flanges are adapted to engage the reduced end of the strip to hold the two ends against lateral displacement while allowing a sliding movement between the same. Upon the outer circumference of strip 1 there is provided a series of spurs 3 struck out from the metal and therefore integral with the strip.

The above constitutes what I have referred to as the inner portion of my protector.

The outer portion consists of a strip of sheet metal similar to the inner strip one end being reduced in width as at A' and the other carrying flanges 2ᵃ thus far, the construction being identical to the inner portion, the strip 1ᵃ is provided with a series of holes 6 corresponding in position to the spurs 3 of strip 1.

In order to prevent these metal strips from injuring the air tube and to prevent any undue rubbing of the parts against one another I have provided friction strips 4 and 4ᵃ of rubber or leather which I secure one each to the inner face of each metal strip. These strips are held in position by means of rivets 5 and 5ᵃ.

In assembling my protector upon a tire the strip 1 is placed upon the tube, and the strip 1ᵃ placed over said strip 1, the spurs of the first strip passing through the holes of the second or outer strip. These spurs are provided long enough to protrude through the outer portion and penetrate into the fabric of the tire casing thereby preventing the protector from being displaced.

Having fully described my invention what I claim is—

In a tire protector an inner portion fitting over the air tube having means for holding its ends in sliding engagement and spurs thereon said spurs extending outwardly, an outer portion fitting over the said inner portion also having its ends held in sliding engagement and openings in said portion adapted to receive the spurs of the inner portion each portion being lined with friction strips and the spurs being of such a length as to penetrate into the tire casing.

Signed at Kingston, county of Frontenac, Province of Ontario, this 31st day of October, 1916.

THOMAS G. OCKLEY.